United States Patent [19]

Okita et al.

[11] Patent Number: 4,774,612
[45] Date of Patent: Sep. 27, 1988

[54] CARRIAGE MOVING DEVICE

[75] Inventors: Masao Okita; Shinichi Omori, both of Furukawa, Japan

[73] Assignee: Alps Electric Co., Ltd., Japan

[21] Appl. No.: 4,150

[22] Filed: Jan. 15, 1987

[30] Foreign Application Priority Data

Mar. 11, 1986 [JP] Japan .................. 61-51352

[51] Int. Cl.$^4$ .................. G11B 5/55; G11B 21/08
[52] U.S. Cl. .................. 360/106
[58] Field of Search .................. 360/106, 104, 105; 74/416

[56] References Cited

U.S. PATENT DOCUMENTS

| | | | |
|---|---|---|---|
| 3,947,893 | 3/1976 | Hall, Sr. .................. | 360/133 |
| 4,273,002 | 6/1981 | Ogasawara et al. .................. | 74/416 |
| 4,466,032 | 8/1984 | Saito .................. | 360/99 |
| 4,652,951 | 3/1987 | Kirn .................. | 360/106 |
| 4,654,737 | 3/1987 | Hopkins et al. .................. | 360/106 |
| 4,688,440 | 8/1987 | Okita .................. | 360/106 |

Primary Examiner—John H. Wolff
Assistant Examiner—David J. Severin
Attorney, Agent, or Firm—Guy W. Shoup; Paul J. Winters

[57] ABSTRACT

A carriage moving device for moving a carriage having a head unit in a radial direction of a disc. The carriage moving device comprises a screw shaft formed with a spiral intermittent driving screw on an outer circumference thereof, the intermittent driving screw being formed by a plurality of groove portions each having a lead angle of substantially zero and each having a straight bottom, the groove portions being so arranged as to be sequentially shifted in the axial direction of the screw shaft, and a stepping motor having a rotating shaft perpendicular to the screw shaft. A spur gear is mounted to the screw shaft, and a crown gear is mounted to the rotating shaft of the stepping motor in such a manner that the spur gear is meshed with the crown gear.

1 Claim, 18 Drawing Sheets

CARRIAGE MOVING DEVICE

BACKGROUND OF THE INVENTION

The present invention relates to a carriage moving device for moving a carriage having a head unit for writing and/or reading a signal to a disc-like information recording medium in a radial direction of the disc-like recording medium.

In a disc driving device for carrying out recording and/or reproducing of information to an information recording medium, it is necessary to move a magnetic head for writing and/or reading a signal in a radial direction of the recording medium. A moving device for moving the magnetic head requires to be equipped with a motor as a driving source and a transmitting mechanism for transmitting a driving power of the motor to a carriage supporting the magnetic head. FIG. 40 shows an example of a conventional carriage moving device of a screw shaft type. Referring to FIG. 40, reference numerals 150 and 151 designate a housing and a stepping motor, respectively. A casing 152 of the stepping motor 151 is fixed to the housing 150 by screws 153. There are incorporated in the casing 152 a motor stator constituted of a coil 155 wound around a coil bobbin 154 and a comb-type yoke 156 integrally formed with the casing 152, and a motor rotor constituted of a cylindrical permanent magnet 157.

Reference numeral 158 designates a screw shaft formed with a spiral groove 158a on an outer circumferential surface thereof. The screw shaft 158 is inserted into the permanent magnet 157, and is fixed thereto. The screw shaft 158 is rotatably supported at its both small-diameter conical ends by bearings 159 and 160 having ball bearings. The bearing 159 is retained by a retainer 162 to the housing 150, and is normally biased to the screw shaft 158 side by a spring 163 incorporated in the retainer 162. Accordingly, the screw shaft 158 is normally biased to the bearing 160 side. The bearing 160 is mounted to an adjusting screw 165 screwed into a support member 164 fixed to the stepping motor 151. The screw shaft 158 is designed to be finely adjustable in the thrust direction by rotating the adjusting screw 165.

A carriage 168 having a writing and/or reading magnetic head (not shown) is adapted to be moved along guide rods 169. The carriage 168 includes an engagement member 170 having a conical edge portion 170a resiliently engaged with a spiral groove 158a of the screw shaft 158. Accordingly, when the screw shaft 158 is rotated in forward and reverse directions by the stepping motor 151, the edge portion 170a of the engagement member 170 engaged with the spiral groove 158a is moved to reciprocate the carriage 168 along the same direction as the axial direction of the screw shaft 158 by the amount corresponding to the rotative quantity of the screw shaft 158.

In the moving mechanism as mentioned above, the housing 150 is formed with a lateral hole 150a, a lateral bore 150b and screw holes 150c so as to mount the stepping motor 151, and the two guide rods 169 are arranged in parallel relation with the screw shaft 158 of the stepping motor 151. The guide rods 169 are mounted at their both ends to grooves (not shown) formed at the housing 150. The grooves are accurately formed to function as a reference plane for maintaining the height of the carriage 168 constant. Therefore, the carriage 168 may be moved along a plane formed by the two guide rods 169 at all times irrespective of the engaged position of the edge portion 170a of the engagement member 170 with the spiral groove 158a of the screw shaft 158. A similar construction is disclosed in Japanese Laid-Open Utility Model Publication No. 60-64470 filed by the same applicant as in this application.

Recently, it has been intensively required to make the disc driving device thin. However, in the conventional carriage moving mechanism, the thickness of the disc driving device is dependent upon an outer diameter of the stepping motor 151. Accordingly, the outer diameter of the stepping motor 151 is required to be reduced, so as to make the disc driving device thin. However, if the outer diameter of the stepping motor 151 is reduced, a driving torque of the motor is reduced. To obtain a required driving torque, it is necessary to elongate the rotor and the stator along the rotating shaft. As a result, the length of the stepping motor is increased to result in reduction in a space factor. In this manner, there is a limit of reduction in thickness and size of the conventional disc driving device.

SUMMARY OF THE INVENTION

It is a primary object of the present invention to provide a carriage moving device having a desired driving torque and a reduced thickness.

It is another object of the present invention to provide a carriage moving device which may contribute to reduction in thickness of a disc driving device.

According to the present invention, there is provided a carriage moving device for moving a carriage having a head unit in a radial direction of a disc. The carriage moving device comprises a screw shaft formed with a spiral intermittent driving screw on an outer circumference thereof, the intermittent driving screw being formed by a plurality of groove portions each having a lead angle of substantially zero and each having a straight bottom, the groove portions being so arranged as to be sequentially shifted in the axial direction of the screw shaft, and a stepping motor having a rotating shaft perpendicular to the screw shaft. A spur gear is mounted to the screw shaft, and a crown gear is mounted to the rotating shaft of the stepping motor in such a manner that the spur gear is meshed with the crown gear.

The stepping motor having a large diameter and a reduced thickness is provided on the lower side of the screw shaft to transmit the rotation of the stepping motor to the screw shaft in the circumferential direction of the screw shaft. Accordingly, reduction in thickness of the disc driving device may be promoted with no reduction in a driving torque. Further, since there is permitted a play in the groove portions of the intermittent driving screw, a position of the carriage is not changed while the engagement member of the carriage is engaged with one of the groove portions. In other words, it is possible to almost eliminate influences to the rotational accuracy of the stepping motor and the moving accuracy of the carriage due to a backlash of the gears. The moving accuracy of the carriage is dependent upon the accuracy of the intermittent driving screw. Therefore, it is sufficient in respect of function to use a stepping motor and gears of low accuracy with reduced costs.

DETAILED DESCRIPTION OF THE PREFERRED EMBODIMENT

Figure 1:
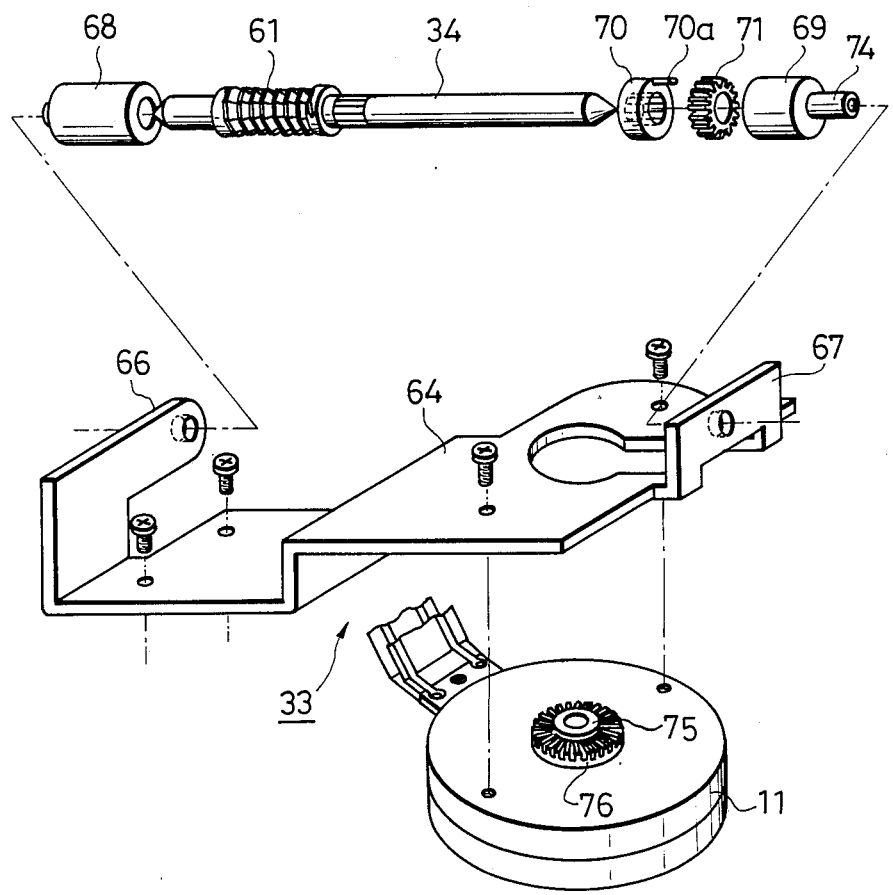
FIG. 1 is an exploded perspective view of the carriage moving unit in a preferred embodiment according to the present invention.
Figure 2:
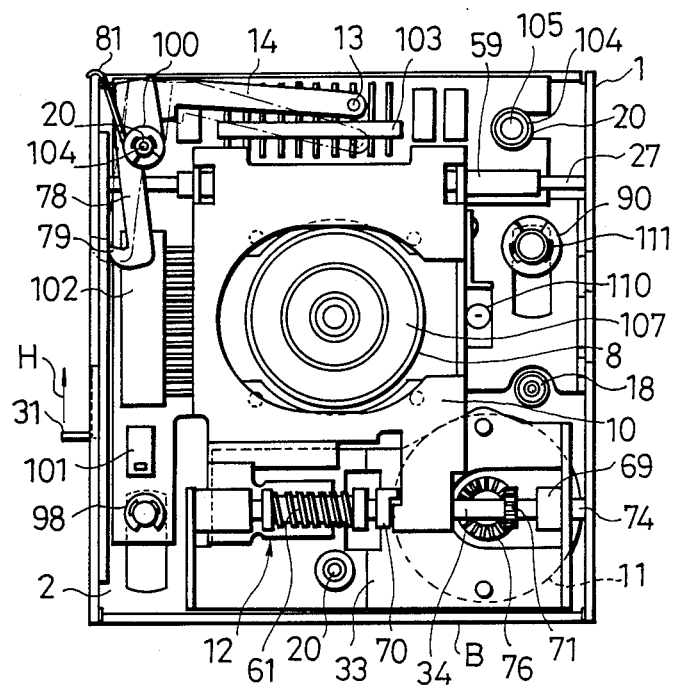
FIG. 2 is a top plan view of the disc driving device.
Figure 3:
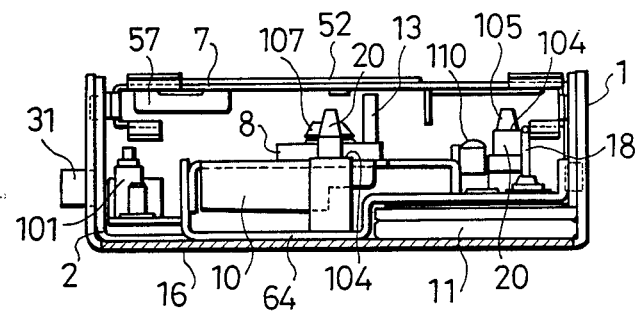
FIG. 3 is a front elevational view of the disc driving device shown in FIG. 2.
Figure 4:
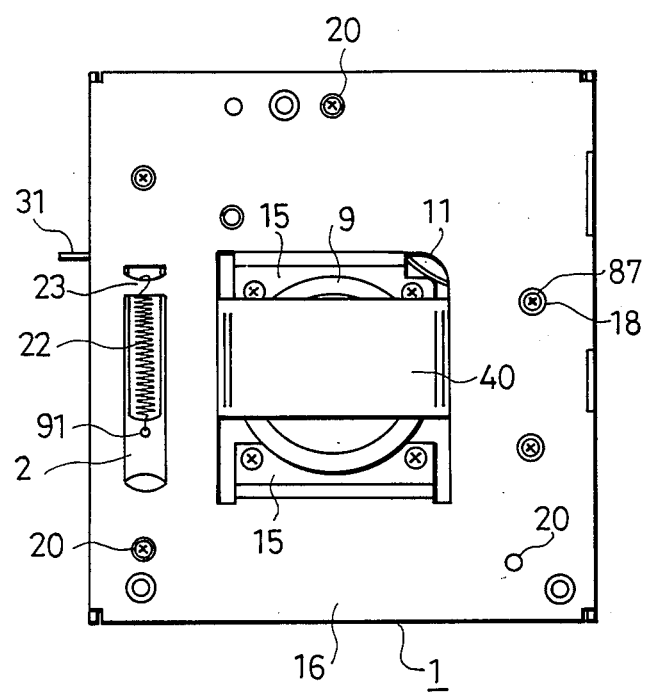
FIG. 4 is a bottom plan view of the disc driving device shown in FIG. 2.

Referring to FIGS. 2 to 4 which show a general construction of a disc driving device provided with a carriage moving unit, the disc driving device includes a frame 1; a slide plate 2 slidable on the upper surface of the frame 1 in the vertical direction as viewed in FIG. 2; a cartridge holder 7 for holding a disc cartridge 50, having side projections 6a and 6b to be engaged with cam grooves 5a and 5b of side plates 37 and 38 of the slide plate 2 adjacent to side plates 24 and 25 of the frame 1; a motor 9 mounted on the upper surface of the frame 1 for rotating a turn table 8, the motor 9 and the turn table 8 constituting a disc driving mechanism; a carriage 10 provided on the upper surface of the frame 1 and adapted to be moved in a radial direction of a disc 51; a carriage moving mechanism 12 for moving the carriage 10 by a stepping motor 11; and a lock lever 14 having an operational pin 13 at the rearmost position in an insert direction of the cartridge 50, and adapted to limit a slide position of the slide plate 2.

Figure 7:
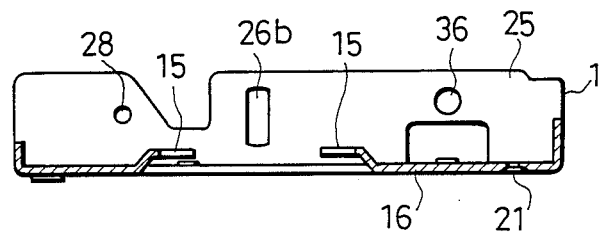
FIG. 7 is a cross-sectional view taken along the line A—A in FIG. 5.

The frame 1 is formed by bending a metal plate with a dimension nearly equal to an external dimension of the disc cartridge 50. As shown in FIG. 7, the frame 1 is centrally formed with a motor mounting portion 15 lifted partially from a bottom plate 16. On a disc cartridge insertion side B of the frame 1, a mounting portion 17 of a carriage moving unit 33 is provided, and a mounting hole 19 of a pad adjusting pin 18 is provided. Mounting portions 21 of positioning pins 20 for supporting the disc cartridge 50 upon loading are provided at one position on the disc cartridge insertion side B and at two corner positions on the opposite side to the insertion side B. Further, a mounting portion 23 of a tension spring 22 for normally biasing the slide plate 2 to the disc cartridge insertion side B.

Figure 6:
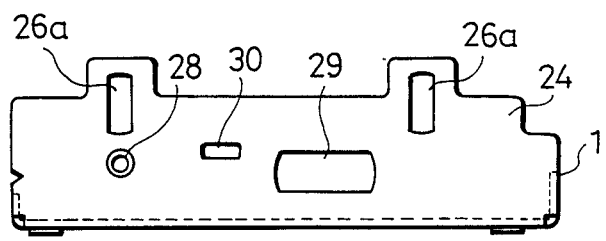
FIG. 6 is a side view of the frame shown in FIG. 5.

Referring to FIG. 6, the side plate 24 of the frame 1 on the left-hand side as viewed from the disc cartridge insertion side B is formed with two guide grooves 26a for guiding the ends of the projections 6a, and with a mounting hole 28 of a guide shaft 27 on the opposite side to the disc cartridge insertion side B. The side plate 24 is further formed with a large opening 29 for engaging or disengaging with an eject lever 31, and with a small opening 14 for engaging or disengaging with the lock lever 14. On the other hand, referring to FIG. 7, the side plate 25 of the frame 1 on the right-hand side as viewed from the disc cartridge insertion side B is formed with similar guide grooves 26b, and with a support hole 36 into which a projecting portion 74 of a bearing 69 of a screw shaft 34 of the carriage moving unit 33 is inserted and supported.

Figure 8:
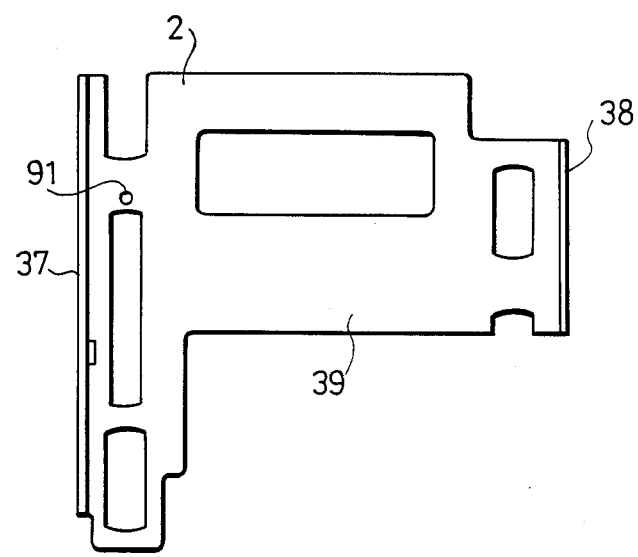
FIG. 8 is a top plan view of the slide plate.
Figure 9:
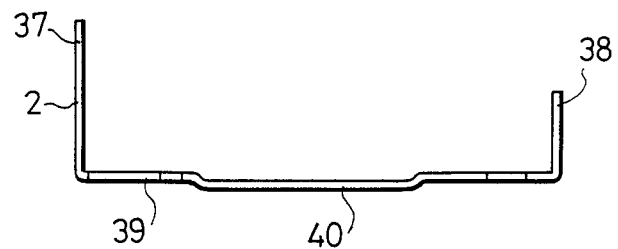
FIG. 9 is a front elevational view of the slide plate shown in FIG. 8.
Figure 10:
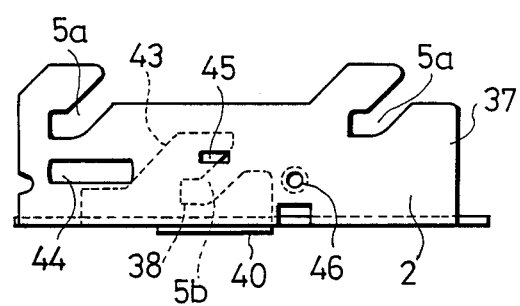
FIG. 10 is a side view of the slide plate shown in FIG. 8.

Referring to FIG. 8, the slide plate 2 includes the side plates 37 and 38 and a connecting plate 39 integrally formed with the side plates 37 and 38. Referring to FIG. 9, the connecting plate 39 is formed with a central recess 40 slightly recessed to the bottom plate 16 side of the frame 1. The recess 40 is located on the lower surface of the motor mounting portion 15 of the bottom plate 16 in such a manner as to be slidable in the motor mounting portion 15. Referring to FIG. 10, the side plates 37 and 38 are formed with cam grooves 5a and 5b into which the projections 6a and 6b of the holder 7 are inserted. Further, the side plate 38 on the right-hand side as viewed from the cartridge insertion side B is formed with a cam surface 43 for lifting and lowering a cam plate 42 having a pad 41 on the opposite side to the cartridge insertion side B. The side plate 37 is formed with a support hole 44 engaged with the guide shaft, and with an engagement hole 45 engaged with the end of the lock lever 14, and with a mounting hole 46 for mounting the eject lever 31 thereto.

Figure 11:
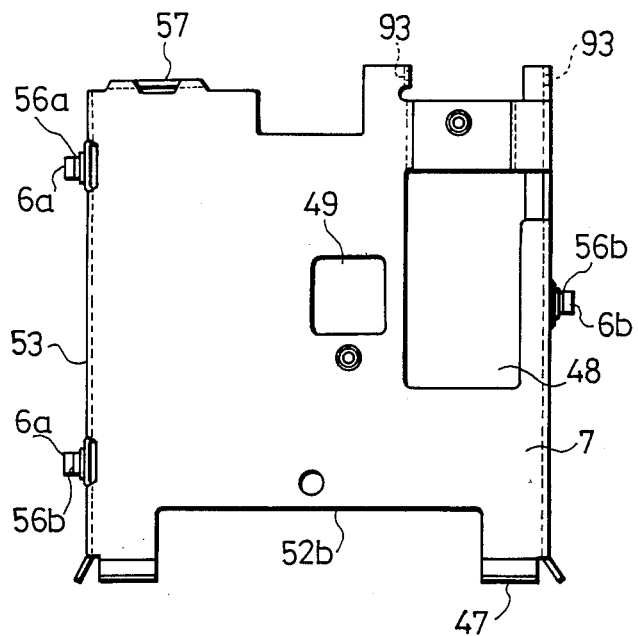
FIG. 11 is a top plan view of the cartridge holder.
Figure 12:
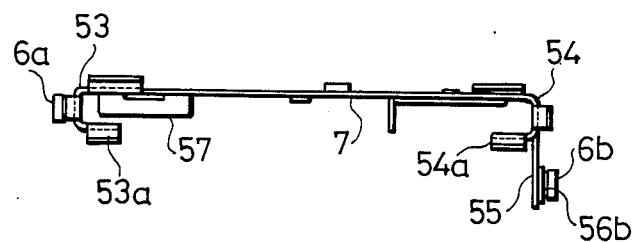
FIG. 12 is a front elevational view of the cartridge holder shown in FIG. 11.
Figure 13:
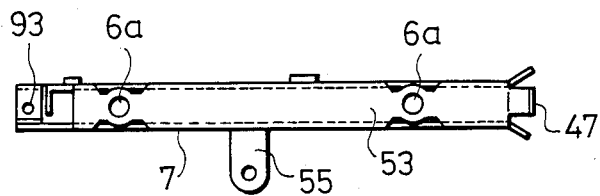
FIG. 13 is a left side view of the cartridge holder shown in FIG. 11.
Figure 14:
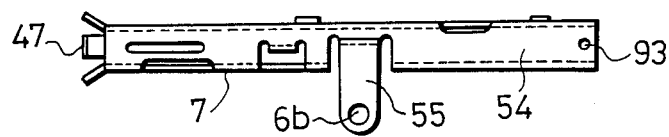
FIG. 14 is a right side view of the cartridge holder shown in FIG. 11.

Referring to FIGS. 11 to 14, the holder 7 includes an insert opening 47 for the disc cartridge 50 at the lower end in FIG. 11, a pad insert opening 48 for the cam plate 42 and a detection opening 49 for a pulse generate sensor (PG sensor) on the upper surface.

A left side surface 53 of the holder 7 as viewed in FIG. 11 is provided with the two projections 6a, and an elastic member 55 integrally depends from a right side surface 54 of the holder 7. The elastic member 55 is provided with the projection 6b at the lower end thereof. Driving rollers 56a and 56b are rotatably mounted inside the projections 6a and 6b to permit the projections 6a and 6b to be moved along the cam grooves 5a and 5b. At the rear-most end of the holder 7 as viewed from the insert opening 47, there is formed a stopper 57 for defining an insert position of the disc cartridge 50. The lower side of the holder 7 as viewed in FIG. 12, that is, the turn table 8 side of the holder 7 is almost entirely opened, and the side surfaces 53 and 54 are formed with support members 53a and 54a on the lower side thereof to support the disc cartridge 50.

Figure 15:
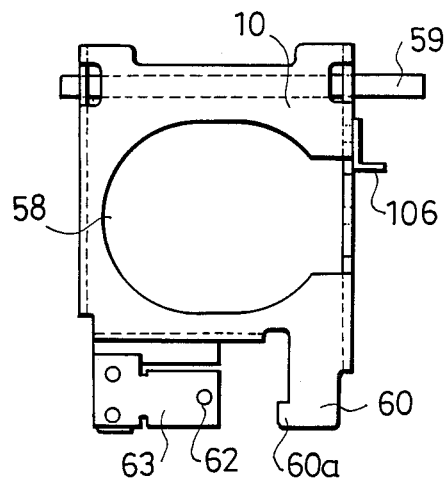
FIG. 15 is a top plan view of the carriage.
Figure 16:
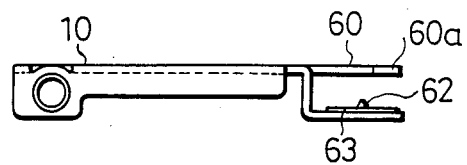
FIG. 16 is a side view of the carriage shown in FIG. 15.
Figure 17:
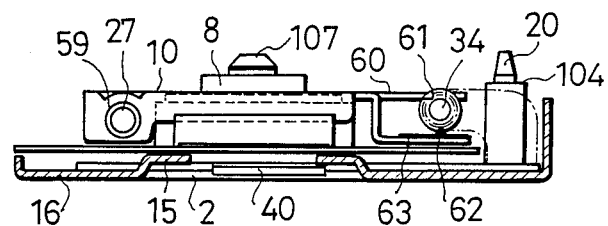
FIG. 17 is a sectional view of the essential part of the carriage and the carriage moving mechanism.
Figure 18:
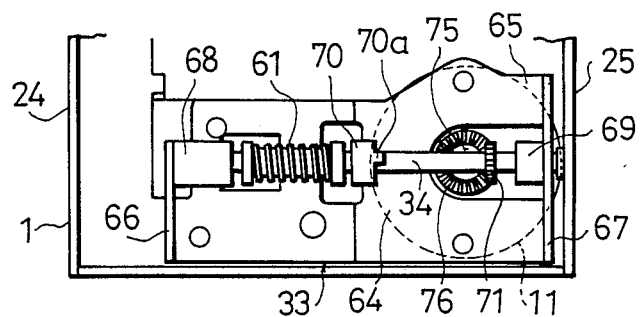
FIG. 18 is a top plan view of the essential part of the carriage moving mechanism and the frame.

Referring to FIGS. 15 and 16, the cartridge 10 includes a turn table insert hole 58 into which the turn table 8 is rotatably inserted. The cartridge 10 is provided at the upper portion as viewed in FIG. 15 with a long span bearing 59 into which the guide shaft 27 is slidably inserted. The bearing 59 is provided with metal members at both ends thereof. The cartridge 10 is provided at the lower portion as viewed in FIG. 15 with an abutment member 60 abutting against the screw shaft 34 of the carriage moving mechanism 12 from the holder 7 side to define a vertical position of the carriage 10, and with a leaf spring 63 for supporting an engagement member 62 engaging from the bottom plate 16 side with a feed groove of an intermittent driving screw 61 of the screw shaft 34, thereby holding the screw shaft 34 at both radial ends thereof. A mounting member 106 for a magnetic head 110 is fixed by a screw to the right side surface of the carriage 10 as viewed in FIG. 15. Thus, the magnetic head 110 is mounted to the mounting member 106 to permit writing of information through the magnetic head 110 to the disc 51.

Referring to FIGS. 1, 17, 18 and 19, the carriage moving unit 33 as a carriage moving device is primarily constructed by a support plate 64, the stepping motor 11 and the screw shaft 34. The support plate 64 is bent to form upper and lower stages. A stepping motor mounting portion 65 is formed at the upper stage, and the stepping motor 11 is mounted on the lower surface of the stepping motor mounting portion 65. The screw shaft 34 is supported by bearings 68 and 69 supported to both side walls 66 and 67 of the carriage moving unit 33. The screw shaft 34 and the stepping motor 11 are assembled with the support plate to form a unit.

Figure 37:
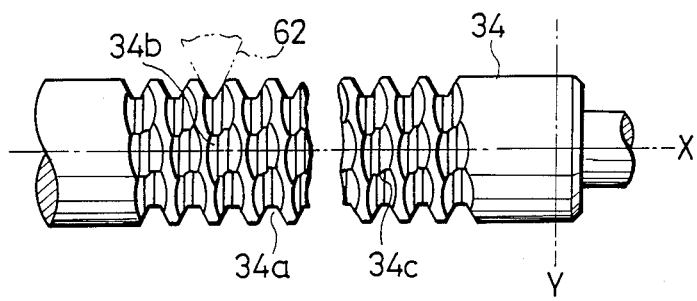
FIG. 37 is a front elevational view of the intermittent driving screw of the screw shaft, partly broken away.
Figure 38:
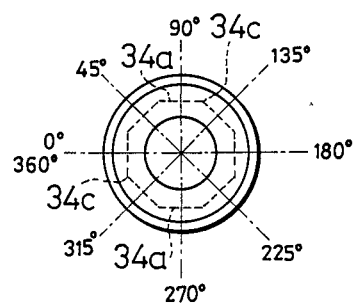
FIG. 38 is a right side view of the screw shaft shown in FIG. 37.
Figure 39:
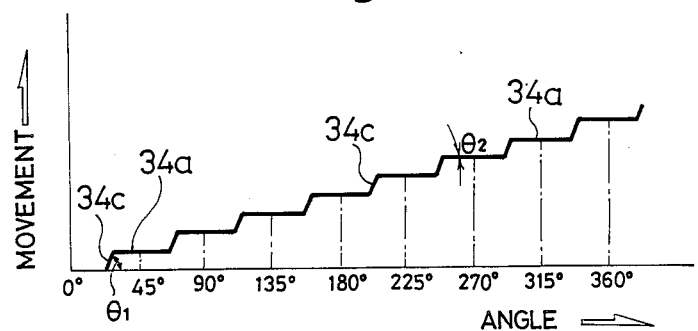
FIG. 39 is a graph showing a lead angle of the intermittent driving screw.
Figure 40:
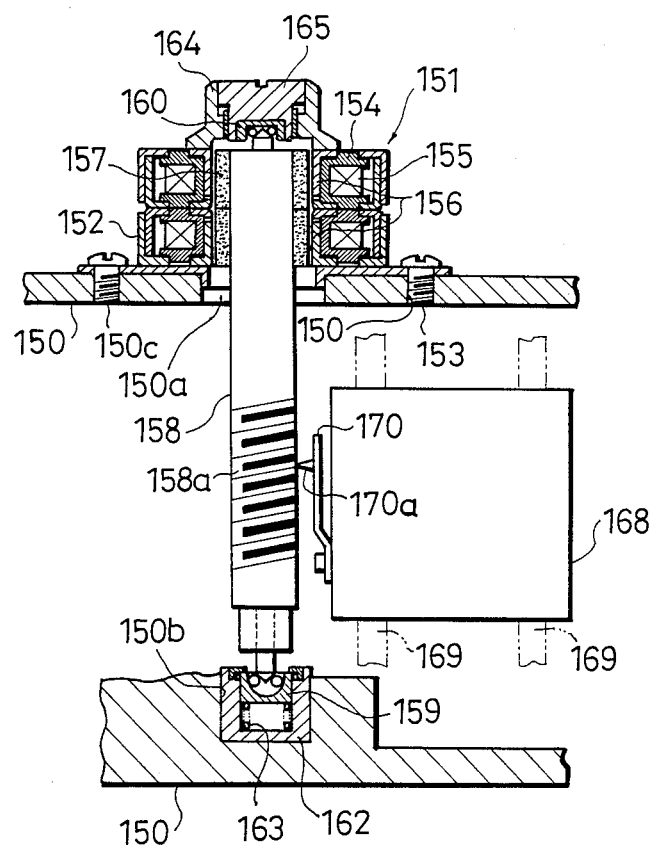
FIG. 40 is a sectional view of the essential part of the carriage moving device in the prior art.

The intermittent driving screw 61 formed on the screw shaft 34 is similar to that disclosed in Japanese Laid-Open Utility Model Publication No. 60-67564 filed by the same applicant as in this application. Referring to FIG. 37, a plurality of groove portions 34a are formed on the outer circumference of the screw shaft 34 in a predetermined axial range. Each of the groove portions 34a is parallel to a perpendicular Y at right angles to an axia X, that is, has a lead angle ($=\theta_2$) of zero, and is straight at its bottom. The groove portions 34a are arranged in such a manner as to be sequentially shifted in the axial direction of the shaft 34, thereby forming a spiral groove 34b. At a connecting portion between the adjacent groove portions 34a, there is formed a feeding portion 34c for feeding the carriage 10 at a predetermined pitch.

In the carriage moving unit 33 as mentioned above wherein the engagement member 62 of the carriage 10 is engaged with the spiral groove (intermittent driving screw) 34b of the screw shaft 34, when the engagement member 62 is slided in the feeding portion 34c of the spiral groove 34b by the rotation of the screw shaft 34, the carriage 10 is moved in a predetermined direction according to a lead angle $\theta_1$. Furthermore, when the engagement member 62 comes to the target groove portion 34a of the spiral groove 34b, supply of current to the stepping motor 11 is cut to stop the movement of the carriage 10. Thus, the engagement member 62 is moved in the feeding portion 34c, and is stopped at the target groove portion 34a to thereby carry out intermittent feed of the carriage 10. Since the lead angle $\theta_2$ in the groove portions 34a is zero, a stop position of the carriage 10 may be properly set to increase the accuracy of the stop position even if a rotary angle of the screw shaft 34 is slightly slipped.

Since the screw shaft 34 employs the aforementioned intermittent driving screw, there is no possibility that the accuracy of the stop position of the carriage 10 is badly influenced by a backlash generated between a crown gear 76 and a spur gear 71 interposed between the rotating shaft of the stepping motor 11 and the screw shaft 34.

The screw shaft 34 is provided with a stopper 70 having a projecting portion 70a engageable with the projection 60a of the abutment member 60 to restrict the rotation of the screw shaft 34 and stop the movement of the carriage 10. This stop position corresponding to a O track position of the magnetic head 110.

Figure 19:
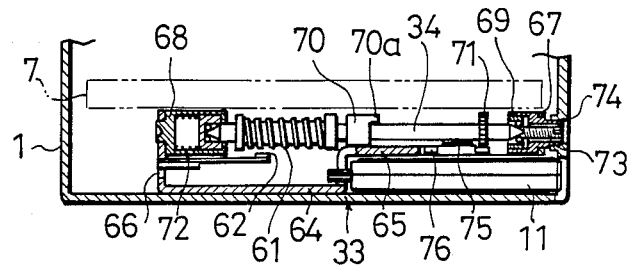
FIG. 19 is an elevational view of the essential part shown in FIG. 18.

The bearings 68 and 69 for supporting both the ends of the screw shaft 34 are pivot bearings to rotatably support the conical ends of the screw shaft 34. As shown in FIG. 19, on the bearing 68 side, the screw shaft 34 is rightwardly biased by a compression spring 72 similar to the retainer member 162 in the prior art, while on the bearing 69 side, an axial position of the screw shaft 34 is adjustable by means of an adjusting screw 73. The bearing 69 is supported to the side wall 67 as mentioned above, and the end 74 of the bearing 69 is projected from the side wall 67. The projected end 74 is inserted into the mounting hole 36 of the side plate 25 of the frame 1 to define a vertical position of the carriage moving unit 33 itself.

The spur gear 71 mounted to the screw shaft 34 is meshed with the crown gear 76 mounted to the rotating shaft 75 of the stepping motor 11 mounted to the support plate 64 to transmit a step operation of the stepping motor 11 through the crown gear 76 and the spur gear 71 to the screw shaft 34. Thus, the rotational operation of the stepping motor 11 is transmitted through the intermittent driving screw 61 to the carriage 10 to advance the same every step.

Figure 20:
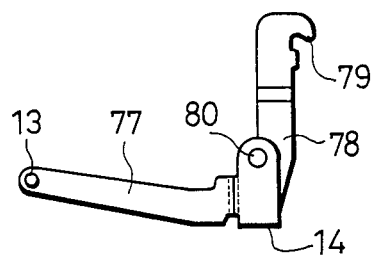
FIG. 20 is a top plan view of the lock cam.
Figure 21:
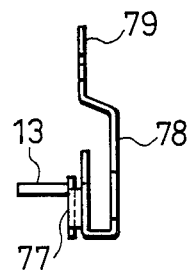
FIG. 21 is a side view of the lock cam shown in FIG. 20.
Figure 22:
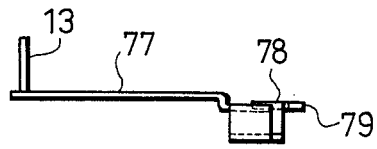
FIG. 22 is a rear elevational view of the lock cam shown in FIG. 20.

Referring to FIGS. 20 to 22, the lock lever 14 is formed in a substantially hooked shape. As shown in FIG. 20, the operation pin 13 is erected at an end portion of a leftwardly extending operational portion 77, and a stop projection 79 is formed at an end portion of an upwardly extending engagement portion 78. At a part where the operational portion 77 is connected at substantially right angles to the engagement portion 78, there is formed a mounting hole 80 into which the positioning pin 20 is rotatably inserted. The operational pin 13 abuts against the front end of the disc cartridge 50 to rotate the lock lever 14 counterclockwise about the mounting hole 80 as viewed in FIG. 20. As a result, the stop projection 79 at the end of the engagement portion 78 is disengaged from the edge portion of the engagement hole 45 of the slide plate 2. In installation, the lock lever 14 is normally biased clockwise by a spring 81 as shown in FIG. 2.

Figure 23:
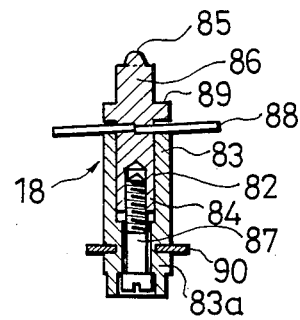
FIG. 23 is a sectional view of the pad adjusting pin.

The pad adjusting pin 18 is projected at its upper end from the pad insert opening 48 of the holder 7 on the disc cartridge insertion side B, and is designed to define a vertical position of the pad 41 provided at the end portion of the cam plate 42 relative to the magnetic head 110. Thus, a vertical position of the disc 51 relative to the magnetic head 110 is defined by defining the vertical position of the pad 41 relative to the magnetic head 110. Referring to FIG. 23, the pad adjusting pin 18 is primarily constructed by a support pin portion 83 having a central through-hole 82, an adjusting pin portion 86 having a female threaded portion 84 at the lower portion and an abutment portion 85 at the upper end, and an adjusting screw 87 inserted from a lower opening of the through-hole 82 of the support pin portion 83 and meshed with the female threaded portion 84 of the adjusting pin portion 86. A spring washer 88 is inserted between the adjusting pin portion 86 and the support pin portion 83. The adjusting screw 87 is rotated to be finely adjusted in such a range where the resilient force of the spring washer 88 is effective. Accordingly, the adjusting pin portion 86 is formed with a collar 89, and the through-hole 82 of the support pin portion 83 is formed with a shoulder 83a abutting against a head portion of the adjusting screw 87.

As shown in FIG. 4, the pad adjusting pin 18 is inserted from the upper surface of the bottom plate 16 into the mounting hole 19, and then the lower end of the support pin portion 83 is outwardly caulked. A restriction pin 111 of the slide plate 2 is erected in a mounting hole 19a to define a vertical position of the slide plate 2 relative to the bottom plate 16 by means of an E-washer 90 as shown in FIG. 2.

Figure 24:
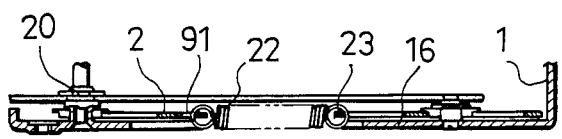
FIG. 24 is a sectional view of the essential part of the spring and the mounting portion thereof.

As shown in FIGS. 4 and 24, the tension spring 22 for normally biasing the slide plate 2 to the disc cartridge insertion side B is provided under tension between the mounting portion 23 of the bottom plate 16 of the frame 1 and an engagement hole 91 of the bottom plate 39 of the slide plate 2. A side surface of the tension spring 22 is designed not to project from the lower surface of the bottom plate 16.

Figure 25:
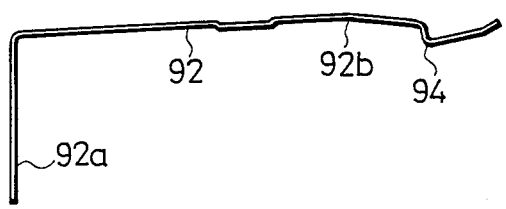
FIG. 25 is a top plan view of the shutter closing spring.

Referring to FIG. 25, a closure spring 92 for a shutter 50e has a short straight portion 92a inserted into a mounting hole 93 formed at the end of the holder 7 on the opposite side to the cartridge insertion side B, and a long portion 92b formed with a bent portion 94 abutting against one end 50g of the shutter 50e upon ejecting of the disc cartridge 50 to close the shutter 50e. That is to say, the bent portion 94 restricts a relative position of the shutter 50e to the holder 7.

Figure 26:
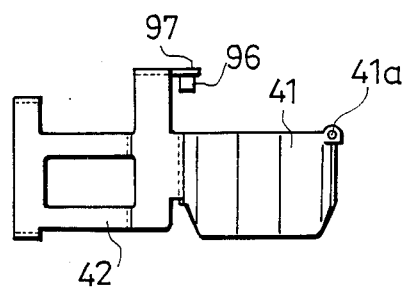
FIG. 26 is a top plan view of the cam plate.
Figure 27:
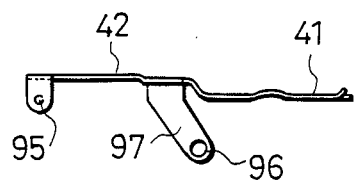
FIG. 27 is a front elevational view of the cam plate shown in FIG. 26.
Figure 28:
FIG. 28 is an enlarged view of the pad of the cam plate.
Figure 31:
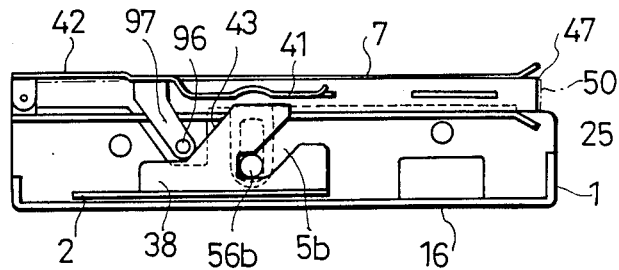
FIGS. 31 to 34 are side views showing the operation of the cam plate.
Figure 32:
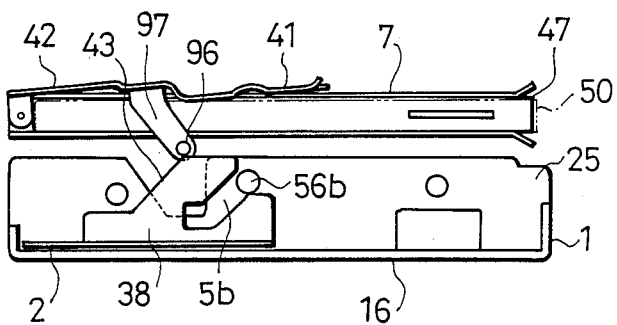

Referring to FIGS. 26 to 28, the cam plate 42 is formed with the pad 41 having such a shape as shown in FIG. 28 at the front side. The short straight portion 93 of the closure spring 92 is rotatably inserted into a mounting hole 95 formed at the base side of the cam plate 42. Thus, the cam plate 42 is rockably coaxially mounted in the mounting hole 93 of the holder 7. At the upper portion of the cam plate 42 as viewed in FIG. 26, a roller 96 rolling on the cam surface 43 formed on the side plate 38 of the slide plate 2 is projected from a lower end of a depending side plate. The pad 41 is formed with a positioning hole 41a at a position opposite to the pad adjusting pin 18. Upon loading of the cartridge, the abutment portion is engaged with the hole 41a to define a vertical position of the pad 41 relative to the magnetic head. Upon unloading of the holder 7, the pad 41 of the cam plate 42 is positioned at the upper portion of the holder 7 as shown in FIG. 32, and upon loading of the holder, the pad 41 is positioned in the holder 7 to press the disc 51 as shown in FIG. 31.

Figure 35:
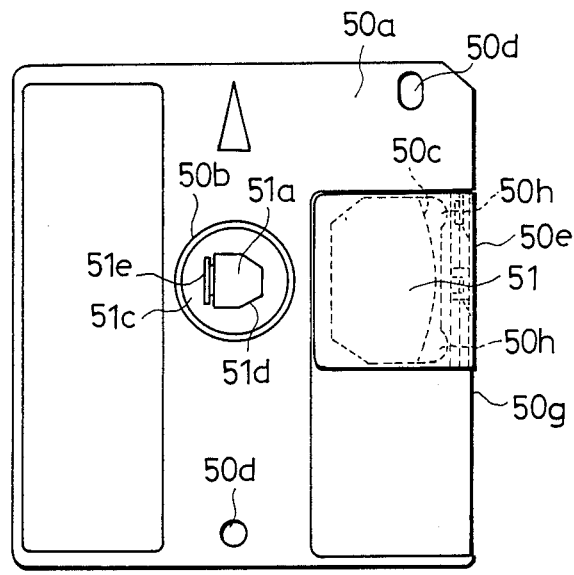
FIG. 35 is a top plan view of the disc cartridge.
Figure 36:
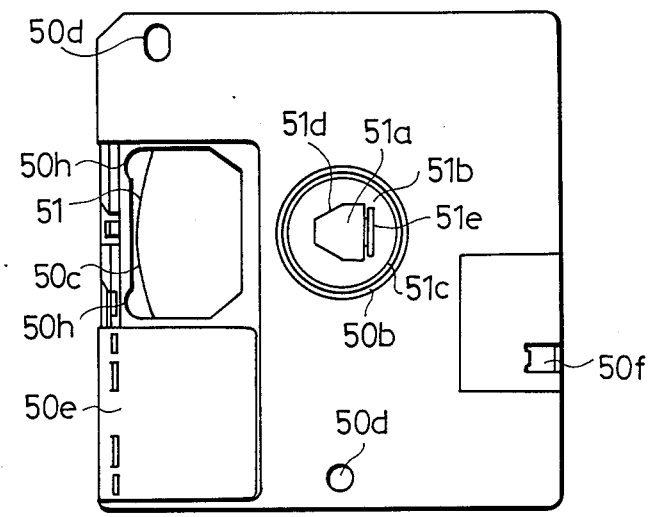
FIG. 36 is a bottom plan view of the disc cartridge shown in FIG. 35.

Referring to FIGS. 35 and 36, the disc cartridge 50 for recording and reproducing information is primarily constructed by the disc 51 as a magnetic recording medium formed of a disc-like magnetic sheet, and a case 50a formed of a hard plastics material. The disc 51 is centrally formed with a shaft insert hole 51a to be engaged with a central fixed shaft (spindle shaft) 107 of the turn table 8, and with a hub 51c assembled with an annular magnetic member 51b. The hub 51c is exposed to a central fixed shaft insert opening 50b of the case 50a. The shaft insert hole 51a is formed with a pressing portion 51e of elastic structure pressing a rotary portion about the fixed shaft against two slant surfaces 51d in such a manner as to be coaxial with the fixed shaft 107. The magnetic member 51b is arranged at a position opposed to an annular magnet 108 assembled with the turn table 8 rotating about the fixed shaft at high speeds. When the turn table 8 is rotated, the magnetic member 51b is attached to the magnet 108 by a magnetic attractive force of the magnet 108. Thus, the disc is rotated with the turn table 8 to carry out recording or the like.

The case 50a is further formed with a magnetic head insert opening 50c into which the magnetic head 110 is inserted, a positioning pin insert hole 50d into which the positioning pin 20 is inserted, and a sliding shutter 50e for opening and closing the magnetic head insert opening 50c. The case 50a includes a write protect notch 50f formed on the turn table 8 side. If a projection of the notch 50f is cut off, rerecording may be prevented.

Referring to FIG. 36, substantially semi-circular recesses 50h appearing at upper and lower positions on the left end of the magnetic head insert opening 50c are provided to permit projection of the pad adjusting pin 18. That is to say, a part of the adjusting pin portion 86 and the abutment portion 85 of the pin 18 are projected from the recesses 50h to thereby define the vertical position of the disc 51 relative to the magnetic head 110 without contacting the pad 41 with the case 50a.

Now, the general construction of the preferred embodiment will be described with reference to FIGS. 2 to 4.

Figure 5:
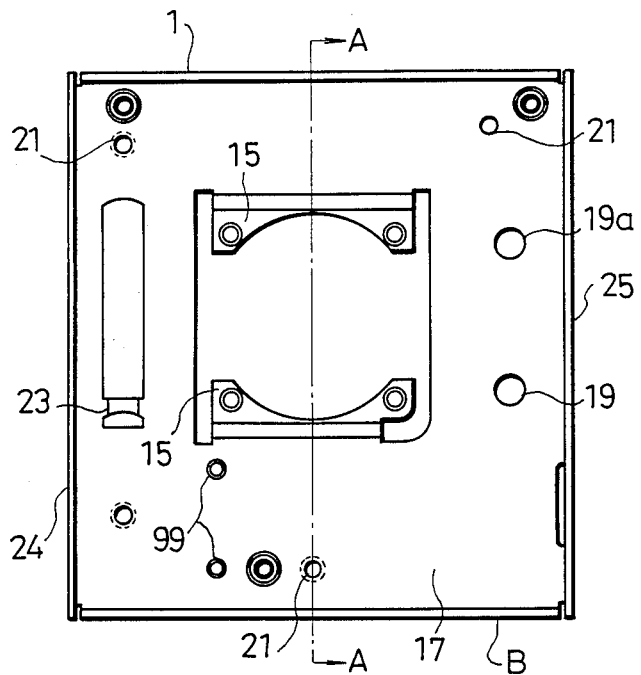
FIG. 5 is a top plan view of the frame.

. The slide plate 2 is slidably mounted on the upper surface of the bottom plate 16 of the frame 1, and the recess 40 of the connecting plate 39 of the slide plate 2 is positioned on the lower side of the motor mounting portion 15 as shown in FIGS. 5 and 7. The spindle motor 9 rotatable at high speeds is fixed by screws to the motor mounting portion 15, and is retained at a predetermined height. The slide plate 2 is reciprocatable on the lower surface of the motor mounting portion 15.

After the slide plate 2 is inserted in the lower portion of the motor mounting portion 15, it is positioned on the bottom plate 16 by means of a part of the positioning pin 20 and the E-washers 90 and 98 engaged with one of the pad adjusting pins 18.

The carriage moving unit 33 is fixed by screws to the unit mounting holes 99 of the bottom plate 16 as shown in FIG. 5 in such a manner that the projecting portion 74 of the bearing 69 is inserted into the mounting hole 36 of the side plate 25 of the frame 1. Thus, the carriage moving unit 33 is fixed at the mounting hole 36 and the two unit mounting holes 99.

The carriage 10 is supported between the guide shaft 27 fixed between both the side plates 24 and 25 and the screw shaft 34 of the carriage moving unit 33, and is permitted to reciprocate laterally as viewed in FIG. 2.

The lock lever 14 is rotatably inserted in the positioning pin 20 at the left upper position as shown in FIG. 2, and is secured by the E-washer 100. FIG. 2 shows a loaded condition of the holder 7 where the disc cartridge 50 is inserted. Under the loaded condition, the operational pin 13 is upwardly displaced to rotate the engagement portion 78 counterclockwise and release the engagement between the engagement portion 78 and the engagement hole 45 of the slide plate 2. As a result, the slide plate 2 is displaced to the disc cartridge insertion side B. Accordingly, the eject lever 31 mounted to the side plate 37 of the slide plate 2 is located at a position of the opening 29 of the frame 1 nearest the cartridge insertion side B as shown in FIG. 2.

There is provided on the cartridge insertion side B of the bottom plate 16 a sensor 101 for detecting whether or not the write protect notch is present and detecting the possibility of writing. There are further provided on the side plate 24 side and the opposite side to the cartridge insertion side B a connector 102 connected to a signal line for the control of the spindle motor 9 and a connector 103 for receiving a writing signal.

As shown in FIG. 3, the positioning pin 20 is provided with a placing portion 104 and an inserting portion 105. The inserting portion 105 is inserted into the positioning pin insert hole 50d formed through the case 50a of the disc cartridge 50, and the placing portion 104 is adapted to abut against the lower surface of the case 50a to position the case 50a.

The projections 6a of the holder 7 on the side surface 53 are inserted through the cam grooves 5a of the side plate 37 of the slide plate 2 into the guide grooves 26a of the side plate 24 of the frame 1. On the other hand, the projection 6b of the holder 7 on the side surface 54, which projection is formed on the elastic member 55, is inserted through the cam groove 5b of the side plate 38 of the slide plate 2 into the guide groove 26b of the side plate 25 of the frame 1 in an interference fit fashion. Thus, the holder 7 is supported between both the side plates 24 and 25 of the frame 1 in such a manner as to be movable vertically only. Under the condition, the roller 96 of the cam plate 42 is rollably placed on the cam surface 43 of the side plate 38 of the slide plate 2.

LOADING OPERATION

There will be now described the loading operation of the disc driving device as mentioned above.

Figure 33:
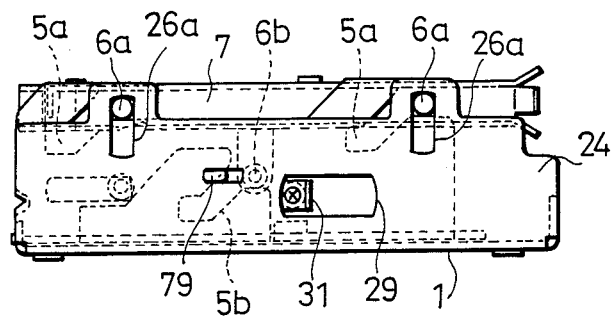

Prior to insertion of the disc cartridge 50 into the holder 7, the holder 7 is located at a position most separate from the turn table 8 as shown in FIGS. 32 and 33. At this time, the projections 6a and 6b of the holder 7 are located at the respective upper-most positions of the guide grooves 26a and 26b, and are positioned on the upper horizontal portions of the cam grooves. Under this condition, the stop projection 79 of the lock lever 14 is engaged with the edge portion of the engagement hole 45 of the slide plate 2 to retain the slide plate 2 at the rear-most position with respect to the disc cartridge insertion side B.

Figure 29:
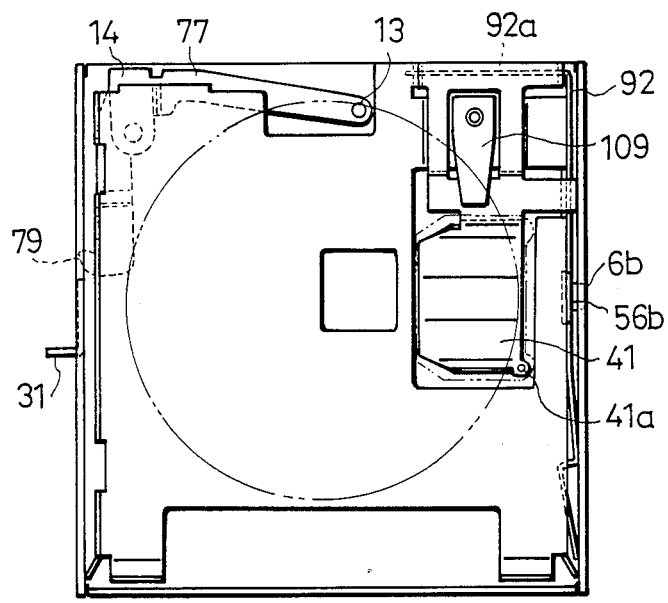
FIGS. 29 and 30 are plan views showing the operation of the cam plate.
Figure 30:
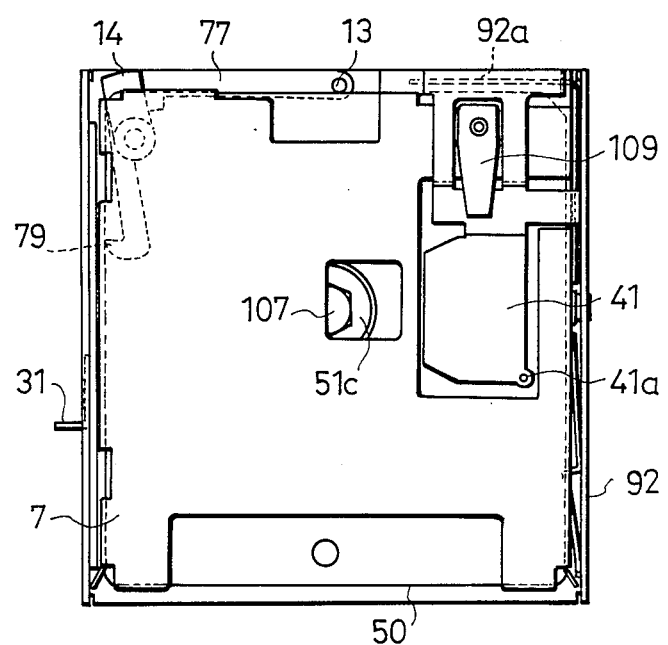
Figure 34:
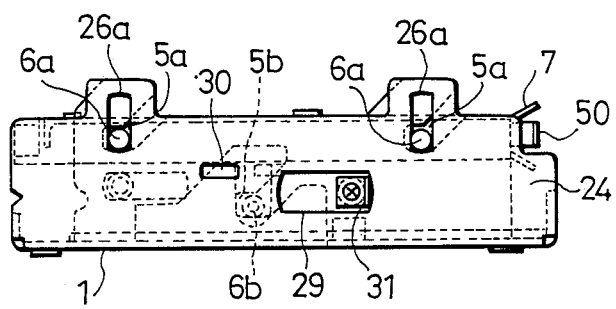

When the disc cartridge 50 is inserted into the holder 7, the front end of the case 50a comes into abutment against the operational pin 13 of the lock lever 14 as shown in FIG. 29. Upon further insertion of the disc cartridge 50, the lock lever 14 is rotated counterclockwise as shown in FIG. 30 to release the engagement between the stop projection 79 and the engagement hole 45 of the slide plate 2. As a result, the slide plate 2 is slided to the cartridge insertion side B by the resilient force of the tension spring 22 normally biasing the slide plate 2 to the cartridge insertion side B. Accordingly, the rollers 56a and 56b at the projections 6a and 6b are displaced along the cam grooves 5a and 5b as shown in FIGS. 31 and 34. This displacement of the projections 6a and 6b along the cam grooves 5a and 5b is converted to a vertical movement to the turn table 8 because the projections 6a and 6b are inserted in the guide grooves 26a and 26b of the frame 1. The lowering position of the disc cartridge 50 is defined by the height of the placing portion 104 of the positioning pin 20 to restrict a further lowering motion of the case 50a. In the course of the lowering motion, the shaft insert hole 51a of the hub 50c of the disc cartridge 50 is fitted with the fixed shaft (spindle shaft) 107, and at the lower-most position of the case 50a, the rotary portion of the fixed shaft 107 is securely press-fitted with the shaft insert hole 51a.

In association with the loading operation, the roller 96 of the cam plate 42 is moved along the cam surface, and the pad 41 is placed in the holder 7 to be finally brought into abutment against the disc 51. Further, a required load pressure may be obtained by a leaf spring 109.

EJECTING OPERATION

After the loading operation is carried out, and the recording or the reproducing is ended, the eject lever 31 projecting from the opening 29 of the side plate 24 of the frame 1 and positioned on the disc cartridge insertion side B is slided to the opposite side to the cartridge insertion side B, that is, in the direction of an arrow H (See FIG. 2). As a result, the slide plate 2 is returned in the direction of the arrow H, and the engagement hole 45 of the slide plate 2 comes to the position corresponding to the stop projection 79 of the lock lever 14. At this time, the lock lever 14 is rotated clockwise by the resilient force of the spring 81 to engage the stop projection 79 with the edge portion of the engagement hole 45. In this operation, the holder 7 is lifted along the cam grooves 5a and 5b to separate the hub 51c of the disc 51 from the turn table 8. When the lock lever 14 is rotated in the aforementioned manner, the operational pin 13 acts to eject the front end of the case 50a toward the cartridge insertion side B by the resilient force of the spring 81. In the course of this operation, as the roller 96 is lifted along the cam surface 43, the cam plate 42 is rotated counterclockwise in FIGS. 31 and 32, and the pad 41 is separated from the disc 51 to be returne to the upper surface of the holder 7, thus completing the ejecting operation with no trouble.

As is described above, since the screw shaft 34 is preliminarily mounted through the bearings 68 and 69 to the support plate 64, and is assembled with the stepping motor 11 as a unit, all the components of the bearings 68 and 69, the screw shaft 34 and the stepping motor 11 may be handled as an assembly to thereby render the assembling easy and reduce costs of the assembling. Furthermore, in the prior art, the housing 150 is necessary to be formed with the holes such as the lateral hole 150*b* for press-fittedly receiving the retainer 162 including the bearing 159, the lateral hole 150*c* for mounting the stepping motor 151, and the lateral hole 150*a* for loosely receiving the screw shaft 158. To the contrary, the present invention eliminates the formation of such holes to thereby reduce costs therefor.

Furthermore, since the flattened stepping motor 11 is located at the position perpendicular to the screw shaft 34, the carriage moving mechanism may be made thin. As a result, the disc driving device may be also made thin.

Moreover, the vertical positioning of the carriage 10 may be effected accurately by defining the height of the insert hole 28 for the guide shaft 27 and the height of the mounting hole 36 into which the projecting portion 74 of the bearing 69 for supporting the screw shaft 34. In addition, since the formation of the insert hole 28 and the mounting hole 36 is effected by simply forming through-holes through a plate, a reduced cost of the formation of the holes may be attained.

What is claimed is:

1. In a carriage moving device including a screw shaft rotatable on a screw shaft axis in an axial direction and formed with a spiral groove on an outer circumferential surface thereof extending spirally along the screw shaft axis, a stepping motor for rotating said screw shaft, and a carriage provided with an engagement member slidably engaged with said spiral groove, said carriage being moved in an axial direction of said screw shaft by the rotation of said screw shaft, the improvement comprising the combination of:

said screw shaft being an intermittent type screw shaft formed by a plurality of groove portions interconnected along said spiral groove, wherein each groove portion has a lead angle relative to the axial direction of substantially zero and a straight bottom having a predetermined length in the circumferential direction of said screw shaft in which said engagement member rests at an intermittent position corresponding to said groove portion; and said stepping motor being of the flat type having a relatively large width, for accomodating a large rotor diameter providing a large torque, and a relatively thin thickness, and having an output shaft and crown gear mounted thereon rotatable on an output axis which is perpendicular to the width of said stepping motor, said stepping motor being oriented with its width in parallel with the axial direction of said screw shaft and its output axis perpendicular to said screw shaft axis, and said crown gear being meshed perpendicularly with a spur gear mounted on said screw shaft, said flat type stepping motor and said crown and spur gear arrangement having a given gear backlash characteristic which results in a certain rotational play to said screw shaft, wherein said predetermined circumferential length of the bottoms of said groove portions of said spiral groove is selected to compensate for the given gear backlash characteristic of said stepping motor and gear arrangement such that said engagement member of said carriage is retained in a groove portion in which it is intermittently positioned and not axially displaced therefrom by the rotational play of said screw shaft due to the given gear backlash characteristic.

* * * * *